US012722575B1

(12) United States Patent
Muller

(10) Patent No.: US 12,722,575 B1
(45) Date of Patent: Sep. 1, 2026

(54) AUTOMOTIVE STORAGE EXTENDER

(71) Applicant: Kristopher Muller, Brooksville, FL (US)

(72) Inventor: Kristopher Muller, Brooksville, FL (US)

( * ) Notice: Subject to any disclaimer, the term of this patent is extended or adjusted under 35 U.S.C. 154(b) by 396 days.

(21) Appl. No.: 18/144,414

(22) Filed: May 8, 2023

(51) Int. Cl.
*B60R 9/06* (2006.01)

(52) U.S. Cl.
CPC .................................... *B60R 9/06* (2013.01)

(58) Field of Classification Search
CPC ............ B60R 9/06; B60R 9/065; B60R 19/48
USPC ........................................ 224/510, 524, 496
See application file for complete search history.

(56) References Cited

U.S. PATENT DOCUMENTS 1,412,192 A * 4/1922 Moore ................. B60R 19/023 224/490
5,033,662 A * 7/1991 Godin .................... B60R 9/065 296/57.1
5,215,234 A * 6/1993 Pasley ...................... B60R 9/06 224/508
5,433,357 A * 7/1995 Alliff ....................... B60R 9/06 224/510
5,445,300 A * 8/1995 Eipper ..................... B60R 9/06 224/538
5,579,973 A * 12/1996 Taft .......................... B60R 9/06 224/495
7,316,339 B2 * 1/2008 Zhang ...................... B60R 9/06 224/524
10,155,465 B2 * 12/2018 Moore ...................... B60P 1/00
2008/0142559 A1 * 6/2008 Lim .......................... B60R 9/10 224/489

* cited by examiner

*Primary Examiner* — Corey N Skurdal
(74) *Attorney, Agent, or Firm* — Mitchell Mehlman, Esq.

(57) ABSTRACT

Automotive storage extenders and systems are provided. A pair of arms can be fitted to deploy through a pair of apertures can be disposed in the bumper of an automotive vehicle. The pair of apertures being can be disposed longitudinally and substantially parallel to the longitudinal axis of the automotive vehicle. The pair of arms can be extended and retracted through the pair of apertures from a stored position to a deployed position. A base plate can ne attached to or detached from the pair of arms for providing a convenient extended storage space and location.

1 Claim, 4 Drawing Sheets

5
8
8
10
10
6
4
4
A
12
2
2
20
20
100

50
100
12
H
12A
15
6
2
4
10
8
5

AUTOMOTIVE STORAGE EXTENDER

BACKGROUND OF THE INVENTION

Tow hitch attachments have long been used for towing purposes, but they can also serve as an option for storage. By adding a tow hitch to a vehicle, the user can attach storage devices and haul additional gear and equipment for road trips, camping trips, and for work purposes.

One of the most popular types of tow hitch attachments for storage is the cargo carrier. Cargo carriers come in various shapes and sizes and are designed to fit onto the hitch receiver of a vehicle. They can provide storage space and can carry a range of items, including luggage, camping gear, sports equipment.

Tow hitch attachments can also be used to transport trailers, which can be used for storage purposes. Trailers can be attached to the hitch receiver of a vehicle and can carry a wide range of items, such as furniture, appliances, and construction materials. They come in various sizes and shapes, including enclosed trailers, open trailers, and flatbed trailers.

When a tow hitch attachment Is used for storage, it is important to consider the weight capacity of the vehicle and the hitch receiver.

Since different hitch receivers have different weight capacities, exceeding the weight limit of the receiver can cause damage to the vehicle and can cause serious safety issues. Further, the size and shape of the attachment can affect the ability to drive the vehicle. In particular, large attachments can be more challenging to maneuver and can affect the vehicle's stability.

Tow hitch attachments can be an excellent option for storage, allowing one to carry additional gear and equipment, however, tow hitch attachments can be complicated, expensive, and unsafe.

United States Pub. No. 20210380175 discloses a tailgate system for a vehicle comprises a tailgate and a support system. The tailgate includes a movable tailgate portion movably connected to the tailgate and configured to cover an access opening in the tailgate. The support system is selectively operable between a connected state connected to both the tailgate and the movable tailgate portion and a disconnected state. The support system in the connected state is configured to support the movable tailgate portion in a step position pivoted downwardly from the tailgate in an open position thereof to provide a step. The support system in the disconnected state is configured to allow the movable tailgate portion to pivot downwardly from the tailgate in a closed position to the downwardly extending open position. The angle of pivotal movement of the movable tailgate portion relative to the tailgate is greater in the downwardly extending open position than in the step position.

United States Pub No. 20210347308 discloses devices and methods for lightweight, modular carrier rack and storage systems for vehicles, for example, carrier rack systems that may be integrated into or may be attached to a vehicle. The system may include a carrier bar and a universal mount coupled to the carrier bar. The universal mount may provide charging contacts, and one or more data transfer points.

United States Pub. No. 20210318189 discloses methods for a load-sensing hitch utilizing a system of strain gauges. An example apparatus includes a hitch including a first support including a first end, a second end, and a mid-portion located between the first end and the second end, the mid-portion having a cross-sectional area smaller than the cross-sectional area of the first end or the cross-sectional area of the second end, a strain gauge located at the mid-portion of the first support, a frame attachment to couple the hitch to a frame of a the frame vehicle, the support coupled to attachment, and a load manager to determine a load condition based on sensor data from the strain gauge.

United States Pub. No. 20200317132 relates to a slidable platform assembly and a method of attaching the assembly to the front end of a vehicle. The assembly comprises a frame attachable to a receiver secured to the front end of the vehicle and comprises a platform slidable within the frame. Various embodiments of slidable platform assembly and methods of attachment to the receiver of the vehicle are herein disclosed.

United States Pub. No. 20150110594 teaches a modifiable rack connected to a vehicle such as a truck or a tractor, that includes a receptacle for holding a variety of items including materials and equipment. The rack system includes a variety of add-ons for organizing and retaining equipment, and a hinged tail gate for easy access. The rack system includes a trailer hitch so a rolling trailer, or the like, can be daisy-chained off the back end. Wheels can be mounted to the rack system so the rack system can used as a rolling cart. The rack system is able to withstand large forces during use because of a tow support spine, and associated structures, which impart tremendous strength.

United States Pub No. 20140291366 discloses a removable enclosure for the rear of a vehicle provides additional storage space or cover for the open rear end of a vehicle, such as an open tailgate of a pickup truck or the open hatch of an SUV. The removable enclosure includes a housing having at least one sidewall and an upper wall defining an open lower end and an open front end. An internal frame is disposed within and supports the housing. The internal frame includes at least one elastic cord extending laterally across the housing. A pair of laterally opposed diagonal supports each extend from an upper edge of the front end of the housing to a lower edge of a rear face of the at least one sidewall. The at least one elastic cord is secured to, and extends between, the pair of laterally opposed diagonal supports.

United States Pub. No. 20120267404 discloses a modular vehicular storage system includes a sub-frame couple-able to a vehicle chassis. The sub-frame is selectively configurable between an expanded and retracted position to accommodate a variety of vehicle widths. At least one storage element, such as a storage container, is mountable to the sub-frame for securing a number of items. The storage container may include a base and a cover movably coupled to the base between an open and closed position for selective access to the interior of the storage container. The sub-frame may accommodate any number of alternative storage elements and may be configured to simultaneously support a number of different storage elements at a given time to provide the user with a number of storage options.

United States Pub No. 20110049839 discloses a garbage can cart having a rectangular platform base and back, front and side walls in which one or more garbage cans may be placed for storage and transport for disposal. The platform base is supported by a pair of wheels at the rear and a U-bar below the front of the base. A handle bar protrudes upward from the rear wall and curves rearward past the wheels for manually moving the cart. A tow adapter comprising a pair of straps is connected to the rear wall below the handle, the straps extending to distal tow block(s) that may be placed in the trunk of a vehicle and secured therein by closing the trunk. Pulling the tow straps tilts the cart backward about its wheels and lifts the U-bar support from the ground until the handle abuts the tow straps, thereby allowing towing of the cart behind the vehicle.

United States Pub. No. 20100206929 discloses a lightweight cargo carrying structure mounted upon arms which cantilever rearward from tow eyes mounted at the rear of a vehicle. This invention provides an efficient way to expand the cargo-carrying capacity of a vehicle.

U.S. Pat. No. 5,033,662 teaches a readily disassembled carrier including a frame having projecting arms that are telescopically engaged with mated tubular pieces attached to the chassis of the vehicle with which the carrier is to be used, and an assemblage of removable panels that cooperate to form a container on the frame. Projecting blocks are provided to limit insertion of the arms into the tubular pieces, and sockets on the frame seat the ends of posts provided on the panels, inserted downwardly thereinto, with flanges on corner bracket pieces slipping into one another for interengagement of adjacent panels.

U.S. Pat. No. 4,676,415 discloses a combined spare tire support and rear step bumper assembly is provided wherein the rear step bumper assembly is mounted from the associated vehicle in the conventional manner but includes a center downwardly and rearwardly opening recess formed therein in which the outer face plate of a drawer-type support extendible rearwardly of the bumper assembly is receivable when the support is in the forward retracted position. The support is in the form of an upwardly opening drawer in which a spare tire assembly (or any other suitable load) may be received and structure is provided for releasably securely locking the face plate assembly of the drawer-type support in a forwardly retracted closed position. Further, the face plate assembly includes the usual lower central horizontal flange of a step bumper from which a trailer ball hitch element may be mounted and the structure provided for locking the face plate assembly of the drawer-type support in the closed position, in conjunction with the conventional step bumper mounting structure increases the trailer load capacity of the step bumper assembly beyond the trailer load carrying capacity of a conventional step bumper.

U.S. Pat. No. 4,676,413 discloses a bicycle carrier having a pair of frame mounting brackets secured to the frame of a vehicle at spaced locations which include tubular sleeves which extend from the rear of the vehicle toward the front of the vehicle. A rack assembly having a U-shaped support tube with an inverted U-shaped portion disposed substantially perpendicular to two ends extending from said portion toward the front of the vehicle. The ends are adapted to be received within the tubular sleeves of the mounting brackets. Bicycle hanger rods are secured to the top of the inverted U-shaped support tube and extend rearwardly therefrom. A locking hasp is provided to lock one or more bicycles onto the hanger rods. Two different embodiments of the frame mounting brackets are disclosed, one being a two-piece clamp for supporting the tube sleeve along its length, and the second, being a mounting plate having holes for bolting the bracket to corresponding holes formed in the frame of the vehicle and having a strut for supporting the tube sleeve along its length.

U.S. Pat. No. 4,403,716 discloses a support rack for vehicles, i.e., automobiles, and the like which is particularly adapted for alternate support and storage of bicycles in one position and for the storage of general materials such as trunks, trash barrels, camping equipment gear, and the like in an alternate position. The storage rack includes a frame which in the bicycle supporting position is positioned in an upright attitude and in the general material supporting position is in a generally horizontal position vis-a-vis the rear or front end of the vehicle on which it is supported. The rack is preferably positioned in an area of low air turbulence at the rear end of the vehicle.

U.S. Pat. No. 4,138,152 teaches a storage box bumper assembly comprising floor, rear wall, front wall and top portions forming a vehicle bumper having a chamber therein, the top portion being hingedly mounted for opening and closing the chamber, and frame members connected to the bumper and extending outwardly therefrom, the frame members being adapted for attachment to a frame portion of the vehicle.

U.S. Pat. No. 4,072,257 ("Hall") discloses an apparatus selectively attached to a vehicle for carrying a load on a platform. The apparatus frame comprises horizontally extending struts carrying the platform and telescopically positioned within and secured to brackets mounted on the vehicle frame. The outer end of a strut houses a fastening assembly for applying a releasable tension to an anchored strap extended over, or connected to, a load carried on the platform. The strap may be anchored to the load, the apparatus frame, or the vehicle. The inner end of a strut houses components of an electrical circuit assembly for supplying current to signal lights on the apparatus frame. The lights may be illuminated when the struts are correctly positioned for securing to the brackets mounted on the vehicle frame.

The instant invention relates to devices and methods for storing items on a platform or base plate that can be attached to extendable and retractable arms protruding from the bumper of a vehicle such as a pickup truck without using a tow hitch.

None of the cited references alone or in combination discloses or suggests the present invention which provides numerous advantages over known devices. The present invention provides an easy to use and convenient storage extension area for a vehicle and not require a vehicle configured with a tow hitch which can be significantly more expensive.

SUMMARY OF THE INVENTION

In one non limiting aspect of the invention, an automotive storage extender includes a pair of arms. The arms can be fitted to deploy through a pair of apertures disposed in a bumper of an automotive vehicle. The pair of apertures can be disposed longitudinally and substantially parallel to the longitudinal axis A of the automotive vehicle. The pair of arms can be extended to a stored position and retracted to a deployed position through the pair of apertures. A base plate can be attached to or detached from the pair of arms thereby forming an extended storage platform.

In some embodiments, the pair of arms can each include one or more telescoping segments.

In other embodiments, the pair of arms can be square, rectangular, or round.

In certain embodiments, each of the pair of arms can include a locking means for locking the pair of arms in the deployed position or in the stored position.

In some particular embodiments, the pair of arms can be a plurality of arms and the pair of apertures can be a plurality of apertures.

In some other embodiments, the base plate can include a plurality of studs and the pair of arms can each include a plurality of matching apertures. The plurality of studs can be fit into the plurality of apertures thereby forming an interference fit and removably securing the base plate to the pair of arms.

In some embodiments, the base plate can include a plurality of apertures and the pair of arms can include a plurality of matching studs. The plurality of studs can fit into the plurality of apertures thereby forming an interference fit and removably securing the base plate to the pair of arms.

In certain embodiments, the base plate can include a plurality of rings for securing one or more items to the base plate.

In some embodiments, the baseplate can include a perimeter wall.

The automotive storage extender of claim 1, wherein the baseplate includes a detachable cover.

In another non limiting aspect of the invention an automotive storage system includes an automotive vehicle. A pair of arms can be fitted to deploy through a pair of apertures disposed in a bumper of the automotive vehicle. The pair of apertures can be disposed longitudinally and substantially parallel to the longitudinal axis A of the automotive vehicle. The pair of arms can be extended and retracted through the pair of apertures. The pair or arms can be extended from a stored position to a deployed position. A base plate can be attached to or detached from the pair of arms.

In some embodiments of this aspect, the pair of arms can each include one or more telescoping segments.

In some other embodiments, the pair of arms can be square, rectangular, or round.

In certain embodiments, each of the pair of arms can include a locking means for locking the pair of arms in the deployed position or in the stored position.

In some embodiments, the pair of arms can be a plurality of arms and the pair of apertures can be a plurality of apertures.

In certain embodiments, the base plate can include a plurality of studs and the pair of arms can each include a plurality of matching apertures. The plurality of studs can fit into the plurality of apertures thereby forming an interference fit and removably securing the base plate to the pair of arms.

In alternate embodiments, the base plate can include a plurality of apertures and the pair of arms can each include a plurality of matching studs. The plurality of matching studs can fit into the plurality of apertures, thereby forming an interference fit and removably securing the base plate to the pair of arms.

In some embodiments, the base plate can include a plurality of rings for securing one or more items to the base plate.

In certain embodiments, the baseplate can include a perimeter wall.

In some embodiments, the automotive vehicle can be a sedan, a sport utility vehicle, or a pick-up truck.

In another aspect, a method of use can include the steps of: a user moving a pair of arms from a stored position to a deployed position; mating a base plate with the pair of arms in a secure locked position; storing items for transportation or use the base plate; removing the base plate from the pair of arms, storing the base plate; and moving the pair of arms back to a stored position substantially flush with a rear bumper of a vehicle.

DETAILED DESCRIPTION

Figure 1:
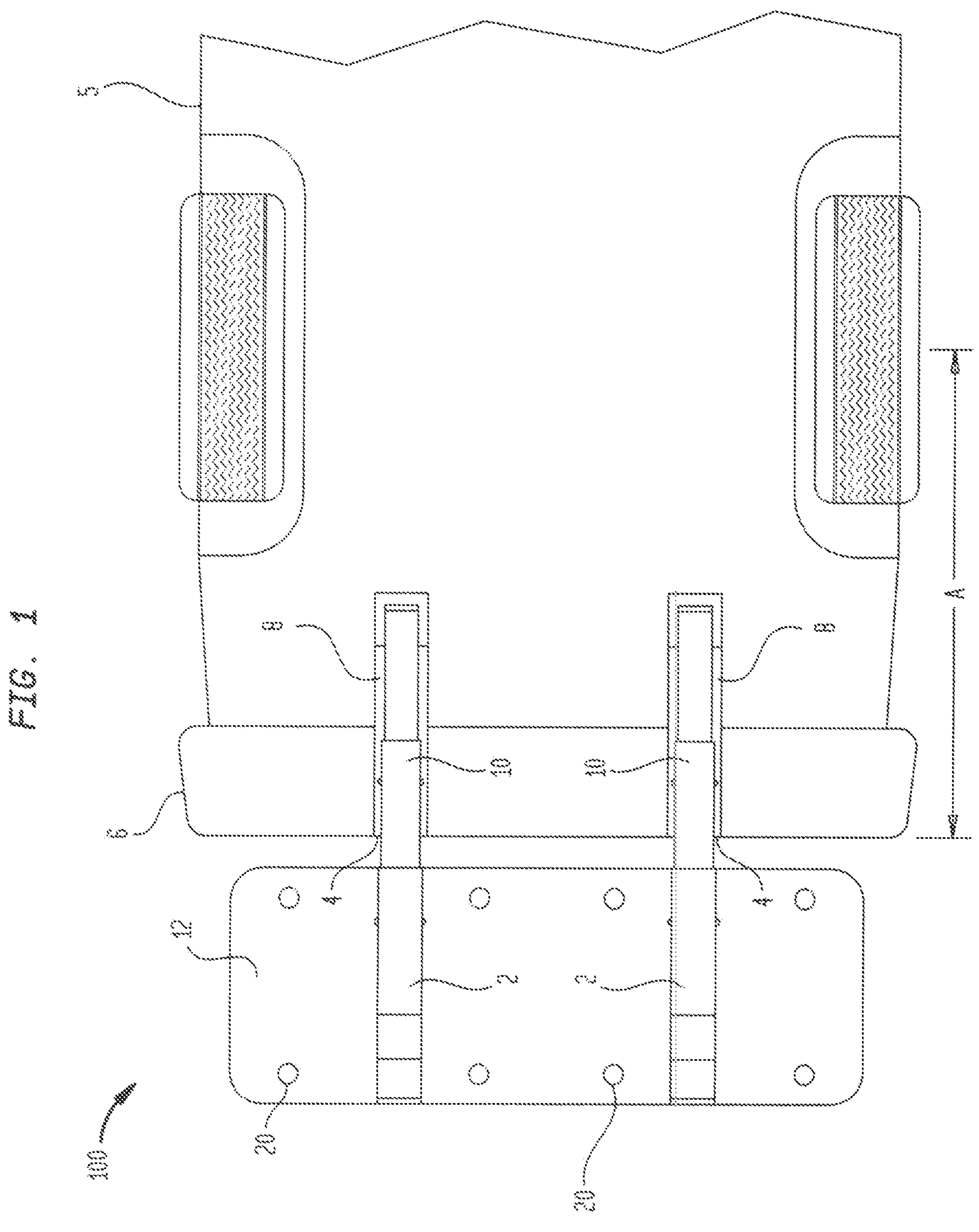
FIG. 1 is top view depicting some of the elements of a particular automotive storage extender of the present invention.

In one non-limiting embodiment of the present invention as shown in FIGS. 1-4, an automotive storage extender 100 includes a pair of arms 2. The arms 2 protrude through a pair of apertures 4 in an automotive vehicle 5 having a bumper 6. The apertures can be disposed longitudinally and substantially parallel to the longitudinal axis A of the automotive vehicle 5. The apertures 4 are disposed in an area 8 such that the apertures 4 do not interfere with other automotive vehicle 5 components. The arms 2 can be extended or retracted through apertures 4 in the vehicle bumper 6. The arms 2 can be extended from a stored position to a deployed position.

Figure 2:
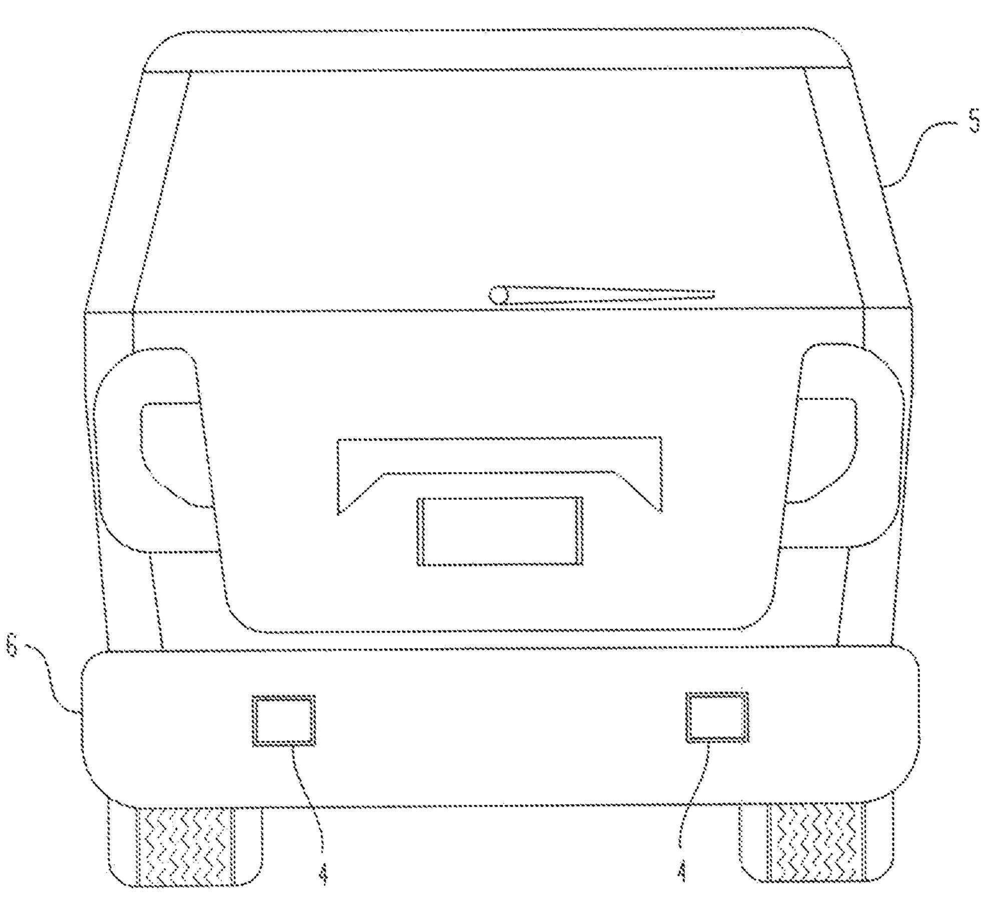
FIG. 2 shows a rear view of some of the elements of the device according to one embodiment of the present invention.
Figure 3:
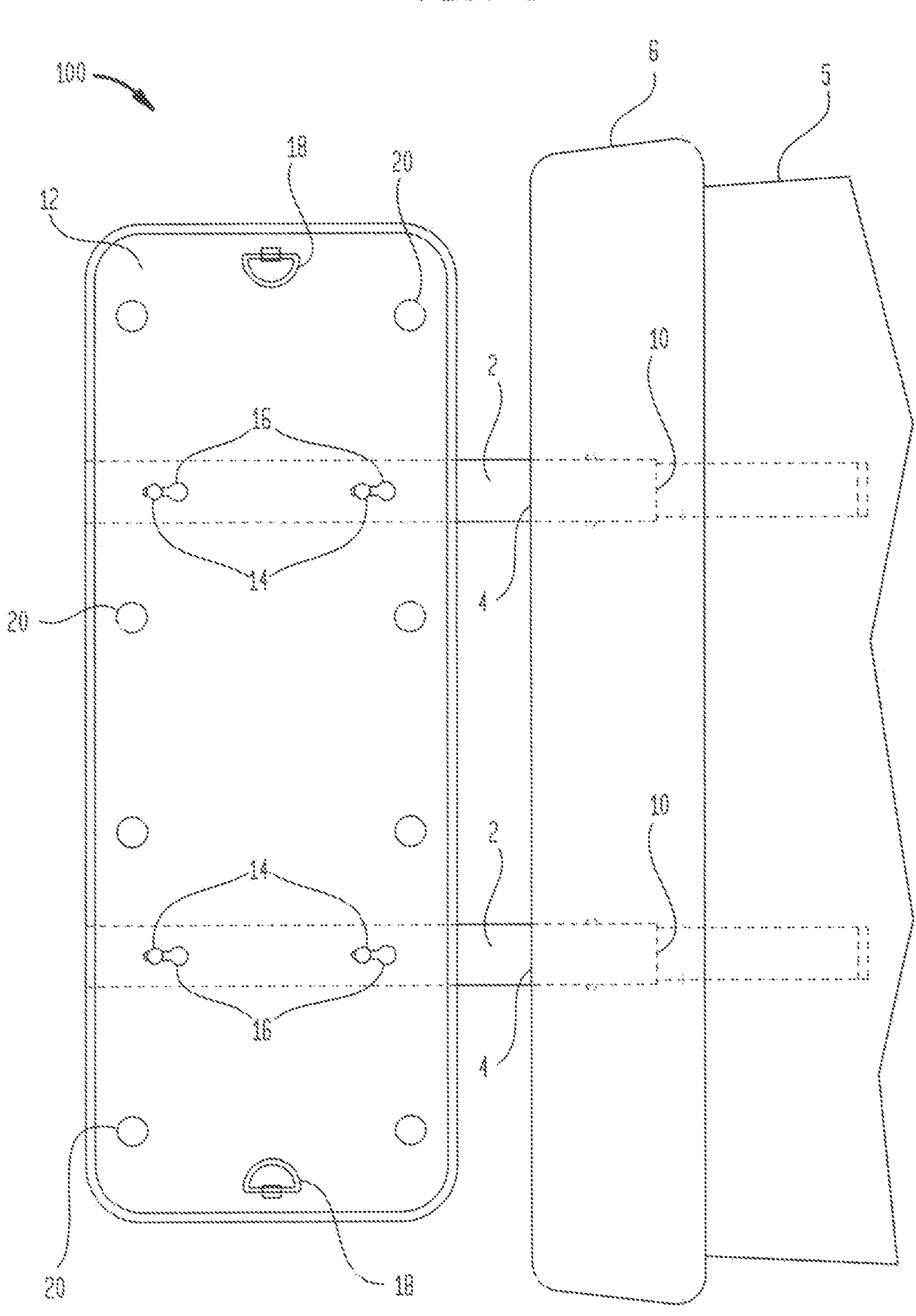
FIG. 3 depicts a bottom view depicting some of the elements of an embodiment of the invention.
Figure 4:
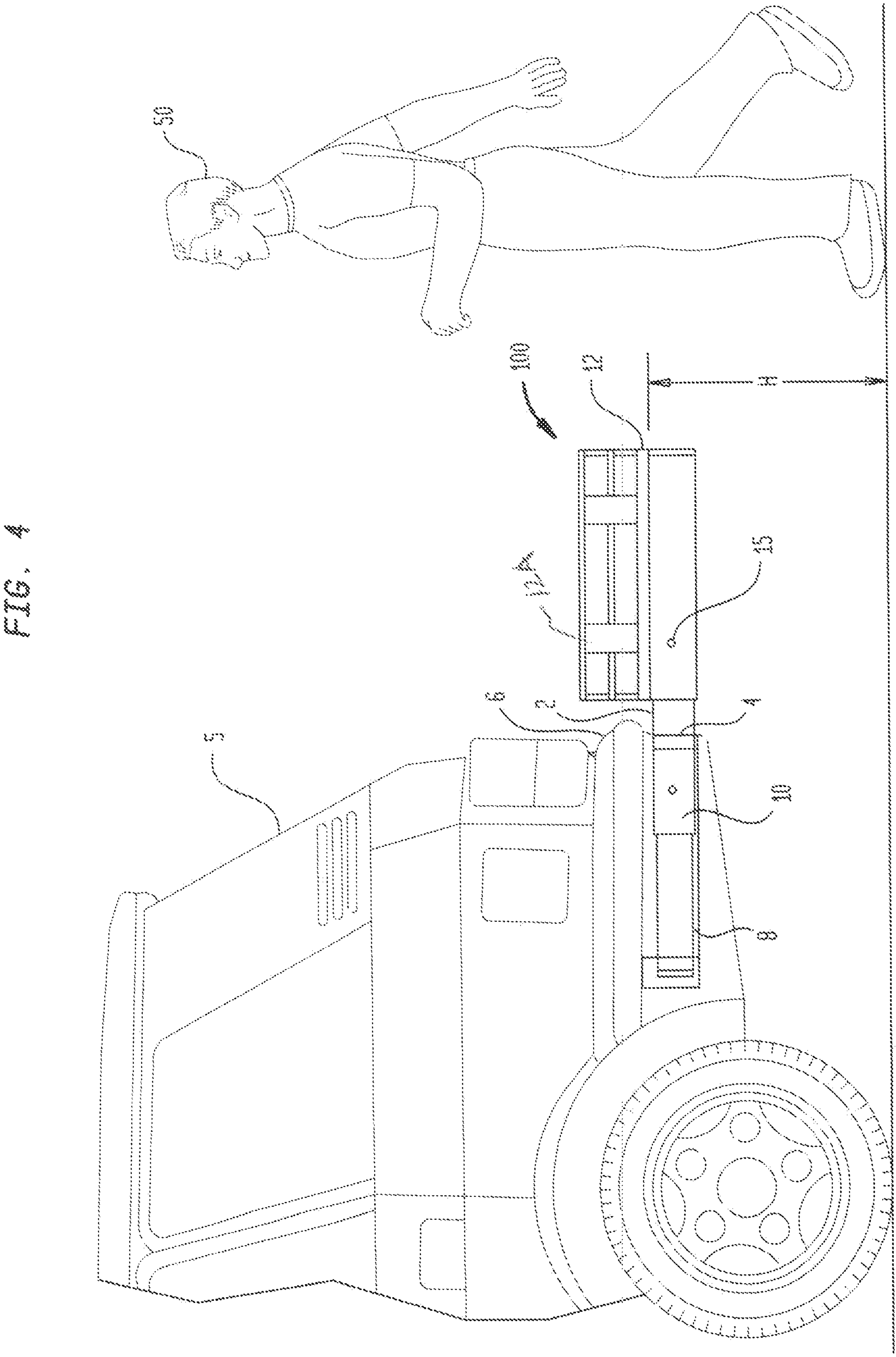
FIG. 4 includes a side view and cross-sectional view depicting some of the elements included in an embodiment.

In some embodiments, the arms 2 can include one or more telescoping segments 10. The arms can be square, round or any other cost effective and functional shape. The arms 2 can be locked in place when deployed. Any known locking means 15 can be used to lock and or unlock the arms in a deployed position or in a storage position. For example, a twist lock mechanism or a pin mechanism can be used to lock or secure the arms 2 in a stored or a deployed position (FIGS. 2 and 4, respectively).

The arms 2 are configured to mate with a base plate 12. The base plate 12 can be attached or detached from the arms 2. In some embodiments, the base plate 12 includes studs 14 which fit into apertures 16 located on the arms 2. The studs and apertures 14, 16 can form an interference fit thus removably securing the base plate 12 to the arms 2. The studs 14 can be located on the base plate 12 or on the arms 2; likewise, the mating apertures 16 can be located to fit the studs 14 on the base plate 12 or the arms 2 respectively.

The base plate 12 can include a plurality of D rings or apertures 18,20 for use in securing items to the base plate 12. For example, the rings 18 or apertures 20 can be used to secure items using a bungee cord or a rope. The base plate 12 can include a perimeter wall or fence 12A, or a cover (not shown).

When detached, the base plate 12 can be stored in flat area of the automotive vehicle 5 such as the bed of a pickup truck or the hatchback or trunk of the vehicle 5.

When the arms 2 are deployed and the base plate 12 is mated to the arms 2, the automotive storage extender 100 can be used to store various items at a convenient height H for a user 50.

Although the invention herein has been described with reference to particular embodiments, it is to be understood that these embodiments are merely illustrative embodiments other arrangements may be devised without departing from the spirit and scope of the present invention as defined by the disclosure herein.

What is claimed is:

1. An automotive storage extender comprising:

a pair of arms fitted to deploy through a pair of apertures disposed in a bumper of an automotive vehicle, the pair of arms each having one telescoping segment and a locking means for locking the each of the pair of arms to each of the telescoping segments in the deployed position or in the stored position, the pair of apertures being disposed longitudinally and substantially parallel to a longitudinal axis A of the automotive vehicle, wherein the pair of arms can be extended to a deployed position and retracted to a stored position through the pair of apertures; and a base plate, the base plate including a plurality of unthreaded studs, the plurality of unthreaded studs fitting into a plurality of matching apertures in the pair of arms thereby forming an interference fit and removably securing the base plate to the pair of arms, the base plate including a plurality of D-rings, the plurality of rings being disposed perpendicular to the longitudinal axis A for securing one or more items to the base plate, the base plate being attachable to or detachable from the pair of arms thereby forming an extended storage platform and wherein the baseplate includes a detachable perimeter wall or fence.

* * * * *